United States Patent
Fairchild (10) Patent No.: US 6,618,249 B2
(45) Date of Patent: Sep. 9, 2003

(54) THERMAL COOLING SYSTEM FOR DENSELY PACKED STORAGE DEVICES

(75) Inventor: Robert Fairchild, Cowan Heights, CA (US)

(73) Assignee: Quantum Corporation, Milpitas, CA (US)

(*) Notice: Subject to any disclaimer, the term of this patent is extended or adjusted under 35 U.S.C. 154(b) by 0 days.

(21) Appl. No.: 10/072,561

(22) Filed: Feb. 5, 2002

(65) Prior Publication Data

US 2003/0147211 A1 Aug. 7, 2003

(51) Int. Cl.[7] .................................................. G06F 1/20
(52) U.S. Cl. ..................... 361/687; 361/726; 312/223.3; 248/611
(58) Field of Search ......................... 361/687, 684–686, 361/724–727; 312/232.1–232.6, 332.1, 333; 248/581, 60, 609, 611

(56) References Cited

U.S. PATENT DOCUMENTS

| | | | | |
|---|---|---|---|---|
| 6,069,789 A | * | 5/2000 | Jung | 361/724 |
| 6,442,020 B1 | * | 8/2002 | Liu et al. | 361/725 |
| 6,460,948 B2 | * | 10/2002 | Roesner et al. | 312/223.1 |
| 6,469,889 B1 | * | 10/2002 | Gan | 361/727 |

OTHER PUBLICATIONS

Pages from ATTO Technology, Inc. Website www.attotech.com downloaded on Aug. 29, 2002 author unknown.
Pages from Medea Corporation Website www.medea.com downloaded on Aug. 29, 2002 author unknown.
Pages from N Stor Technologies Website www.nstor.com downloaded on Aug. 29, 2002 author unknown.
Pages from Raidtec Corporation Website www.raidtec.com downloaded on Aug. 29, 2002 author unknown.
Pages from Chaparral Network Storage Website www.chaparralnet.com downloaded on Aug. 29, 2002 author unknown.

* cited by examiner

Primary Examiner—Darren Schuberg
Assistant Examiner—Hung Van Duong
(74) Attorney, Agent, or Firm—James P. Broder; Steven G. Roeder (57) ABSTRACT

A cooling system (27) for use with a storage system (10) having a storage device (18) includes a drive rail (22), a rail channel (24) that is adjacent to and at least partly bounded by the drive rail (22), and a fluid source (20) that provides a fluid to remove heat from the storage system (10). The storage device (18) is coupled to the drive rail (22). As the storage device (18) operates it generates heat. At least a portion of the fluid from the fluid source (20) is moved through the rail channel (24) to remove the heat from the storage system (10).

30 Claims, 7 Drawing Sheets

THERMAL COOLING SYSTEM FOR DENSELY PACKED STORAGE DEVICES

FIELD OF THE INVENTION

The present invention relates generally to storage devices for storing data. More specifically, the present invention relates a cooling system to enable high-density packaging of multiple storage devices.

BACKGROUND

Disk drives, or other storage devices, are widely used in computers and data processing systems for storing information in digital form. In a conventional disk drive, a transducer "flies" upon an air bearing or cushion in very close proximity to a storage surface of a rotating data storage disk. The storage surface carries a thin film of magnetic material having a multiplicity of magnetic storage domains that may be recorded and read back by the transducer.

The operation of the individual storage devices causes power to be dissipated as heat energy. This heat energy must be removed from the storage devices. If the heat energy is not removed from the storage devices, they can reach or exceed their maximum operating temperature very quickly. This may cause the storage devices to fail prematurely.

As computer use continues to increase, there is naturally a corresponding increase in the need to find sufficient storage volume for a greater number of disk drives, or other storage devices. Often a large number of storage devices are packaged together in close proximity to each other in mass storage systems so as to minimize the overall storage volume required. Within these storage systems, a number of storage devices are often stacked one above the other and positioned side by side within a larger enclosure. By packaging a large number of storage devices close together, the temperature within the enclosure will increase. As a result thereof, a cooling system is needed to remove the heat energy away from the storage devices.

Previous attempts at developing cooling systems to remove the heat energy from the relatively high-density packaging of storage devices, and the individual storage devices themselves, have primarily used thermal convection systems. These systems move large volumes of air across or through the storage system to remove the heat energy created by operation of the storage devices. This large volume of airflow requires open spaces around each storage device and throughout the storage system as a whole. The necessity of these open spaces limits the overall density of the storage devices relative to the volumetric space of the storage system.

In light of the above, there is a need to provide a reliable, simple and efficient manner to remove the heat energy that is produced by the operation of the storage devices. There is also a need to provide a cooling system that enables high-density packaging of storage devices, thus reducing the free air space surrounding the storage devices, without damaging or limiting the effectiveness of the storage devices. There is still another need to enable a greater number of storage devices to be mounted into a much smaller physical envelope, thus resulting in a higher data storage capacity. There is yet another need for a cooling system for storage systems that is relatively easy and cost-effective to manufacture, assemble and use.

SUMMARY

The present invention is directed to a cooling system for use with a storage system having a storage device. The cooling system includes a drive rail, a rail channel that is adjacent to and at least partly bounded by a channel side of the drive rail, and a fluid source that provides a fluid to remove heat from the storage system. The storage device is coupled to an attachment side of the drive rail. As the storage device operates it generates heat, and that heat must be removed from the storage device and the storage system. At least a portion of the fluid from the fluid source is moved through the rail channel to remove the heat from the storage system.

The cooling system further includes a bracket that is coupled to the attachment side of the drive rail and secures the storage device to the drive rail. In one embodiment, both the drive rail and the bracket are made from material having a relatively high thermal conductivity to promote the transfer of heat away from the storage device and toward the drive rail and the rail channel. By effectively transferring heat away from the storage device toward the drive rail and the rail channel, the fluid from the fluid source can remove the heat from the rail channel and the drive rail. This makes possible a storage system with a plurality of storage devices that are packed closer together than would be possible if the fluid from the fluid source was applied entirely to remove the heat by convection method directly from the storage devices. This also increases the efficiency and reduces the overall cost of the storage system.

The present invention is also directed to a storage system and a method for cooling a storage system having a storage device that generates heat while in operation.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1A:
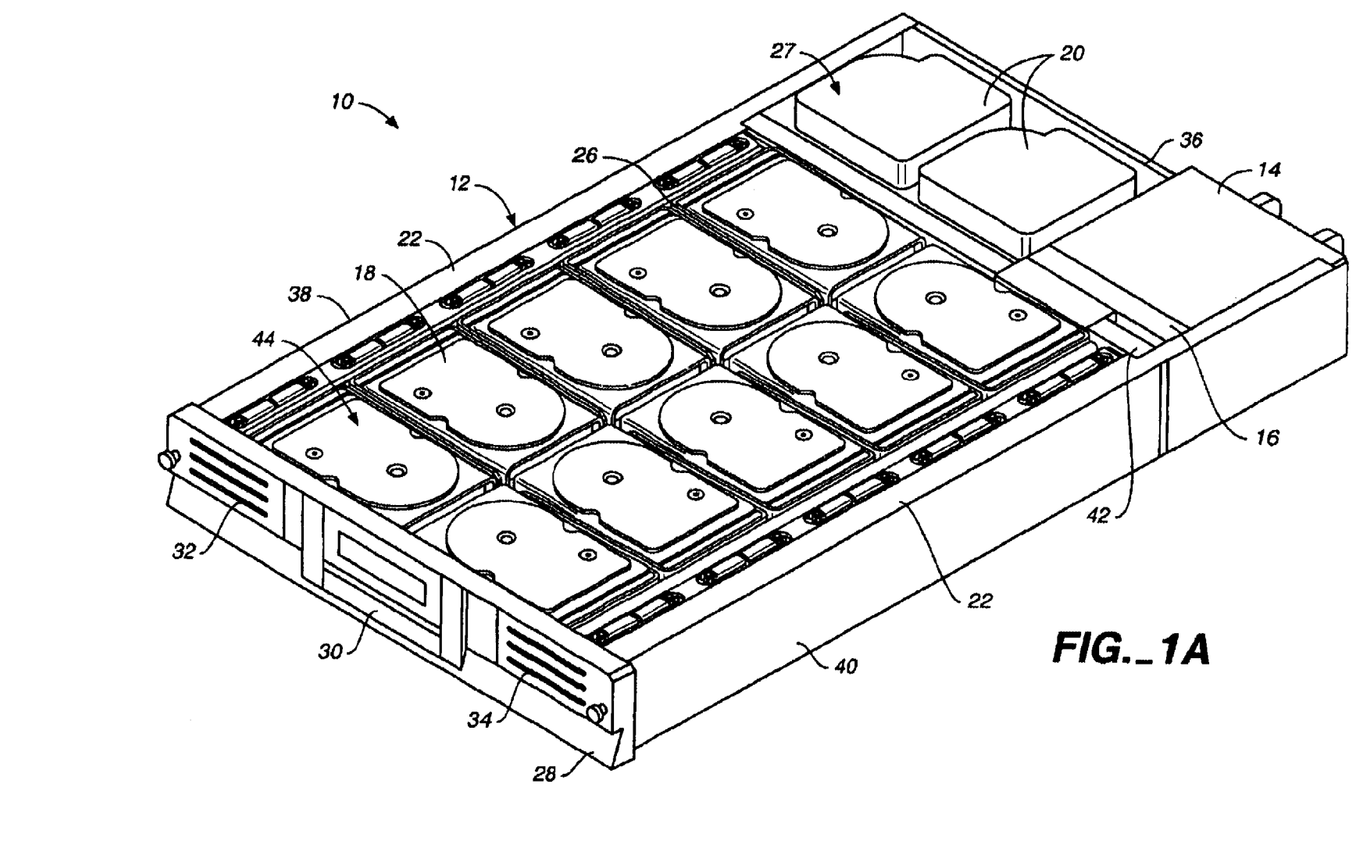
FIG. 1A is a perspective view of a storage system having features of the present invention.
Figure 1B:
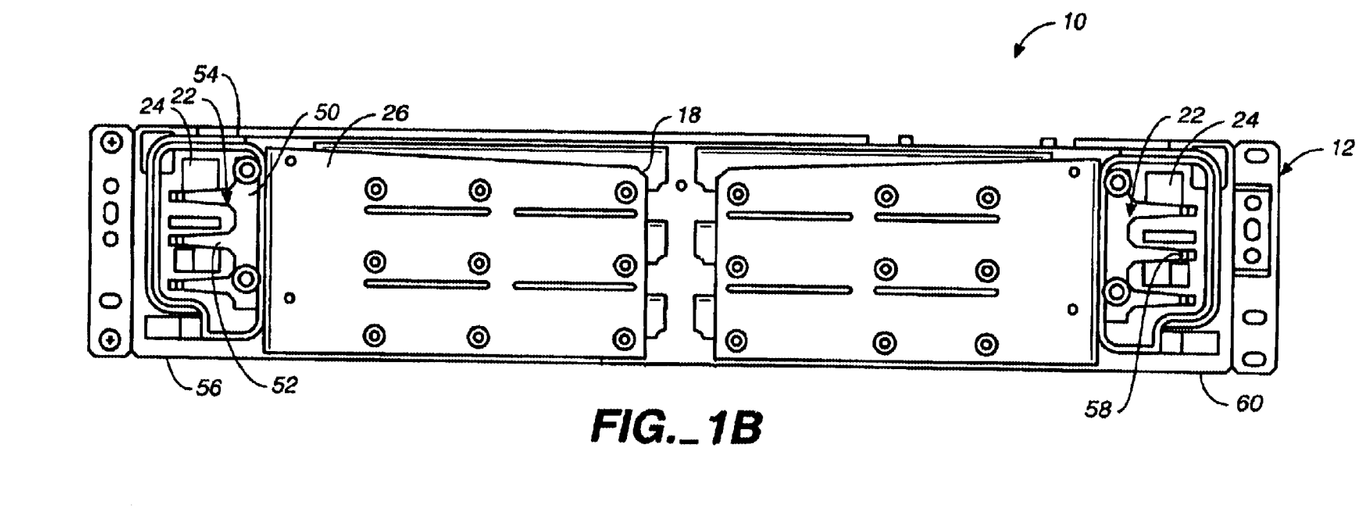
FIG. 1B is a front plan view of the storage system of FIG. 1A with a front housing cover removed.

Referring initially to FIGS. 1A and 1B, a storage system 10 according to the present invention includes (i) a housing 12, (ii) a power source 14, (iii) a controller 16, (iv) a plurality of storage devices 18, (v) a fluid source 20, (vi) one or more drive rails 22, (vii) one or more rail channels 24, and (vi) a plurality of brackets 26. As provided herein, the fluid source 20 provides a fluid that is moved through the storage system 10 to remove heat away from the storage devices 18. In the present invention, at least a portion of the fluid is moved through the rail channel(s) 24 that is bounded by the drive rail(s) 22 and the housing 12. The fluid source 20 and the rail channels 24 define a cooling system 27 that cools the storage system 10.

The housing 12 supports the components of the storage system 10. In FIG. 1A, the housing 12 is generally rectangular frame shaped and encircles the components of the storage system 10. The housing 12 can be made of metal or another rigid structure. The housing 12 can include (i) a front housing cover 28 having an LCD operator control panel 30, a left vent 32, and a spaced apart right vent 34, (ii) a rear housing side 36, (iii) a left housing side 38, (iv) a right housing side 40, and (v) a passive mid-wall 42 that extends transversely between the housing sides 38, 40. The mid-wall 42 separates the fluid source 20, the power source 14 and controller 16 from the storage devices 18.

The front housing cover 28 fits securely around the front housing side and covers the front housing side. The front housing cover 28 further secures the drive rail(s) 22, the brackets 26 and the storage devices 18 within the storage system 10.

In FIG. 1A, the housing 12 is sized to receive two drive rails 22 and ten device packs 44, each including three storage devices 18. By designing the housing 12 to receive two drive rails 22, and the attached storage devices 18, the storage system 10 can store a substantial amount of data. The size of the housing 12 can be altered to accommodate more or fewer storage devices 18 and drive rails 22 as required by the individual storage system 10.

The power source 14 provides power to the storage system 10 so that the storage devices 18 can operate properly when they are accessed from a remote computer system (not shown). The power source 14, as shown in FIG. 1A, can be mounted adjacent to the rear housing side 36 and the right housing side 40. Alternately, two power sources can be utilized to provide redundancy. With this design, the storage system 10 will still be able to operate in the event that one of the power sources fails.

In FIG. 1A. each of the storage devices 18 is a disk drive. Each of the storage devices 18 can be controlled by the controller 16 to alternately be in a power-off mode, a standby mode, an idle mode, and a write/read mode. The controller 16, as illustrated in FIG. 1A, can be mounted near the right housing side 40, adjacent to the power source 14. In the power-off mode, no power is supplied to the storage devices 18. In the standby mode, power is supplied to the storage devices 18 but the storage disks are not spinning. In the idle mode, power is supplied to the storage devices 18 and the storage disks are spinning, but there is no write or read activity. In the write/read mode, power is supplied to the storage devices 18, the storage disks are spinning, and there is write or read activity. The power consumed by the storage devices 18, and therefore the heat generated from the storage devices 18, increase as you progress through each of the four modes.

The storage system 10 illustrated in FIG. 1A contains a plurality of storage devices 18 for storing data. The remote computer system can be designed to access the storage system 10 to read and write data that is contained on the storage devices 18. When the storage devices 18 are operating they will generate heat and that heat must be removed so that they may continue to operate effectively and efficiently.

In one embodiment, the computer system only accesses a limited number of storage devices 18 at any one time. In FIG. 1A, the cooling system 27 is designed to adequately cool the storage system 10 with ten storage devices 18 in the write/read mode and twenty storage devices 18 in the standby mode during the transfer of data. Alternately, more than ten or less than ten storage devices 18 may be in the write/read mode at any one time. As the number of storage devices 18 operating varies, the amount of fluid from the fluid source 20 and the flow rate of the fluid can be varied to achieve the required cooling within the storage system 10.

Each of the storage devices 18 fits within one of the brackets 26 within the storage system 10. Stated another way, each of the brackets 26 is designed to hold a plurality of storage devices 18. The brackets 26 are in turn secured to one of the drive rails 22, thereby effectively securing the storage devices 18 to the drive rail 22. The brackets 26 and drive rail(s) 22 are designed to transfer heat away via conduction from the storage devices 18 and toward the rail channel(s) 24.

The fluid source 20 provides fluid to remove heat from the storage system 10 and the storage devices 18. In FIG. 1A, the fluid source 20 is situated near the rear housing side 36 and the left housing side 38. By removing the heat from the storage devices 18, the storage system 10 will necessarily be cooled, and the storage system 10 will be able to operate more effectively and efficiently.

In FIG. 1A, the fluid source 20 includes two fans that cause fluid to flow through the two rail channels 24. One fan can be a primary fluid source to move fluid through the two rail channels 24. A second fan can be a secondary fluid source to provide fluid to the two rail channels 24. The second fan can serve as a backup fluid source to provide a cooling fluid to the storage system 10 when the primary fluid source is unable to sufficiently cool the storage devices 18. Alternately, the storage system 10 can be designed with more or less than two fans. The fluid source 20 is in fluid communication with the rail channels 24 to move the fluid through the rail channels 24.

One purpose of the present invention is providing the fluid from the fluid source 20 to remove heat from the storage system 10 and the storage devices 18 through the rail channel 24. Additionally, some of the fluid from the fluid source 20 will also be passed in and around the storage devices 18. In passing the fluid in and around the storage devices 18, the cooling system 27 will remove any additional heat that has not been transferred away from the storage devices 18 to the drive rail 22 and rail channel 24.

The fluid source 20 can be designed to pull fluid, e.g. air, or blow fluid primarily through the rail channels 24 to cool the storage devices 18. Alternately, the fluid source 20 can be designed and positioned to move other types of fluids through the rail channel 24 to remove heat from the storage system 10. The fluid source 20 can be designed to move fluid through the storage system 10 with a flow rate of at least approximately 30 CFM. Alternately, the fluid source(s) can be designed with a flow rate higher than 30 CFM or lower than 30 CFM depending upon the requirements of the individual system. For example, if more than ten storage devices 18 are operating, the flow rate can be increased so that sufficient cooling is supplied to the storage system 10 and the individual storage devices 18.

As provided herein, in one embodiment, at least approximately 70% of the fluid is moved through the rail channels 24. Alternately, at least approximately 50% of the fluid is moved through the rail channels 24. Still alternately, at least approximately 35% or 15% of the fluid can be moved through the rail channels 24. Stated another way in one embodiment, at least approximately 70% of the heat generated by the storage devices 18 is transferred to the drive rails 22. Alternately, at least approximately 50%, or 35%, or 15% of the heat generated by the storage devices 18 is transferred to the drive rails 22.

FIG. 1B illustrates a front plan view of the storage system 10 with the front housing cover removed. As shown in FIG. 1B, each drive rail 22 has an attachment side 50, a channel side 52, a top portion 54 and a bottom portion 56. The brackets 26 are secured to the drive rail 22 along the attachment side 50. Positioned adjacent to the channel side 52 of the drive rail 22 is the rail channel 24. The channel side 52 of the drive rail 22 establishes an inner boundary of the rail channel 24. An outer boundary of the rail channel 24 is established by the housing 12. An upper boundary of the rail channel 24 is established by the top portion of the drive rail 22. The top portion 54 of the drive rail 22 extends substantially horizontally away from the channel side 52 of the drive rail 22. Similarly, a lower boundary of the rail channel 24 is established by the bottom portion 56 of the drive rail 24. The bottom portion 56 of the drive rail 22 extends substantially horizontally away from the channel side 52 of the drive rail 22.

Each drive rail 22 is designed with a plurality of fins 58 that cantilever away from the channel side 52 of the drive rail 22 substantially perpendicularly to the channel side 52. The fins 58 extend away from the channel side 52 of the drive rail 22 into the rail channel 24. In FIG. 1B, each drive rail 22 includes three fins 58 extending away from the channel side 52. Alternately, the number of fins 58 that extend away from the channel side 52 of the drive rail 22 may be varied to suit the particular requirements of the individual storage system 10.

Secured to a front end of each drive rail 22 is a rail handle 60 that can be used to remove the drive rail 22 and any attached brackets 26 and storage devices 18 from the housing 12. The rail handle 60 is substantially C-shaped and is secured to the drive rail 22 near the top portion 54 and the bottom portion 56 adjacent to the channel side 52. The rail handle 60 is designed to rotate between a closed position and an open position. When in the closed position, as shown in FIG. 1B, the rail handle 60 extends substantially perpendicularly away from the channel side 52 of the drive rail 22. The rail handle 60 is designed to pivot outward away from the rail channel 24 approximately 90 degrees through the front housing side (i.e. the open side) and can be held in this open position (not shown). By pulling on the rail handle 60 while it is in the open position, the drive rail 22 and any attached brackets 26 and storage devices 18 can be easily removed from the housing 12. When not in use, the rail handle 60 is biased to return to the closed position.

Figure 2:
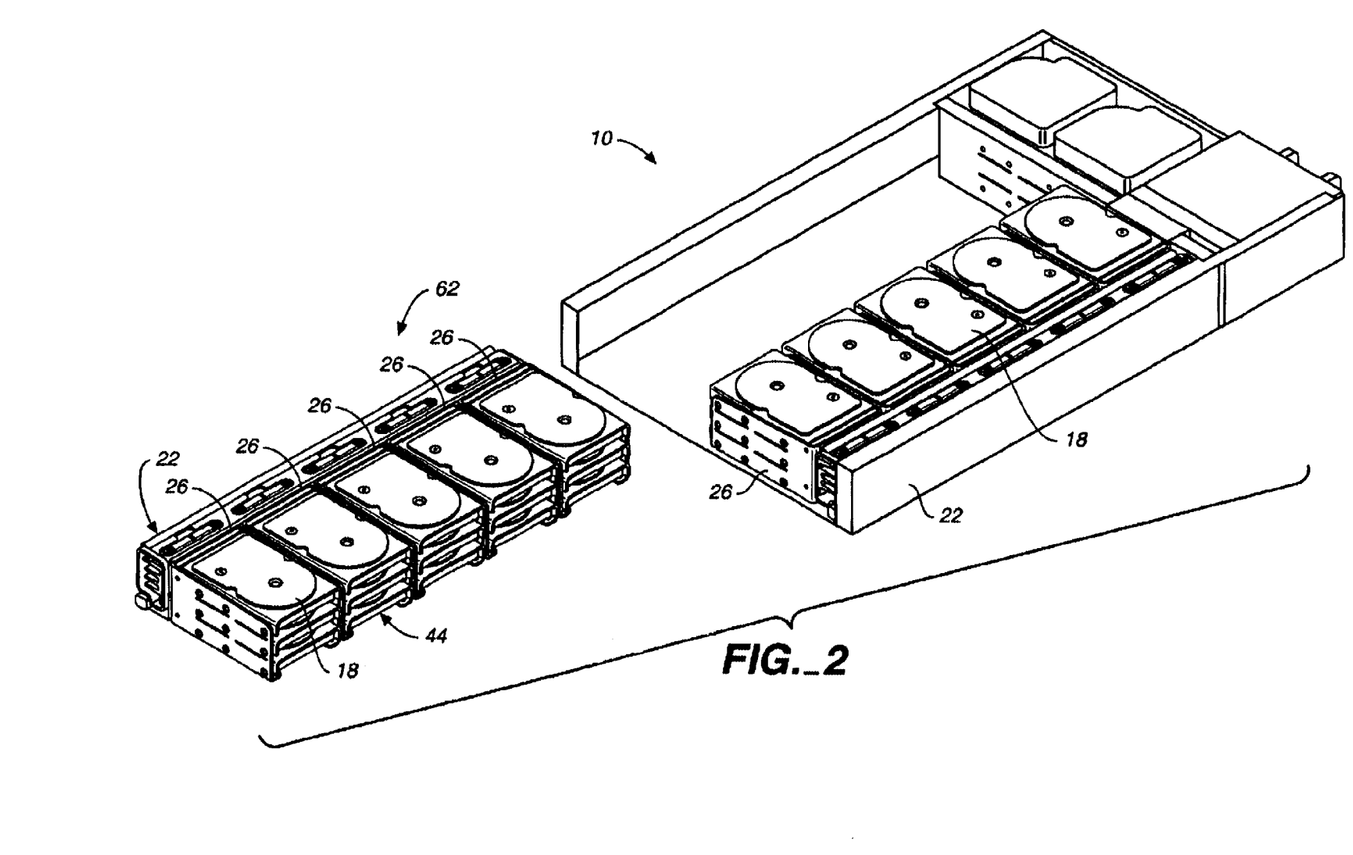
FIG. 2 is a partially exploded perspective view of a storage system having features of the present invention.

FIG. 2 illustrates the storage system 10 after one drive rail 22, and the attached brackets 26 and storage devices 18, has been removed from the housing 12 through the front housing side. The housing 12 is closed on the other three sides to substantially enclose all of the other elements of the storage system 10. The front housing side is open to enable the drive rail 22, brackets 26 and storage devices 18 to easily be removed from the housing 12 by using the rail handle 60 as noted above. While the drive rail 22 is outside the housing 12 as shown in FIG. 2, the brackets 26 and subsequently the storage devices 18 can be easily removed from the brackets 26 for testing, repair or replacement. After any storage devices 18 have been necessarily tested, repaired or replaced, the drive rail 22 and the attached brackets 26 and storage devices 18 can easily be slid back into place inside the housing 12.

In FIG. 2, each drive rail 22 is designed to receive five brackets 26 and five corresponding storage device packs 44 within the storage system 10. The drive rail 22 can be designed to receive more or fewer brackets 26 depending upon the particular requirements of the storage system 10. The brackets 26 are mounted on the drive rail 22 side by side with a minimal amount of horizontal spacing between the individual brackets 26. This helps to enable more data to be stored in a smaller physical space. In one embodiment, the horizontal distance between the brackets 26 in the present invention is approximately 0.05 inches. Alternately, the horizontal distance can be less than approximately 0.375 inches, or less than approximately 0.25 inches, or less than approximately 0.125 inches.

Each of the storage device packs 44 can include three storage devices 18 stacked vertically on top of one another within each bracket 26. The housing 12, as in FIG. 2, can be of a height sufficient to receive the storage device packs 44 with three vertical storage devices 18. Alternately, the housing 12 can be of a height sufficient to receive more than three or less than three storage devices 18 stacked vertically depending on the requirements of the individual storage system.

According to FIG. 2, with each drive rail 22 receiving five brackets 26, each with a storage device pack 44 with three storage devices 18, each drive rail 22 can hold fifteen storage devices 18. With two such drive rails 22, the storage system 10 can hold thirty storage devices 18. Alternately, the storage system 10 can be designed to hold more than thirty or less than thirty storage devices 18 depending on the requirements of the particular storage system 10. For example, the storage system 10 could be designed with only fifteen storage devices 18.

It should be noted that the combination of the drive rail 22, the five brackets 26 secured to the drive rail 22 and the fifteen storage devices 18 secured with the five brackets 26 to the drive rail 22 are collectively referred to as a rail assembly 62. The storage system 10 can be designed with less than two or more than two rail assemblies 62.

Figure 3:
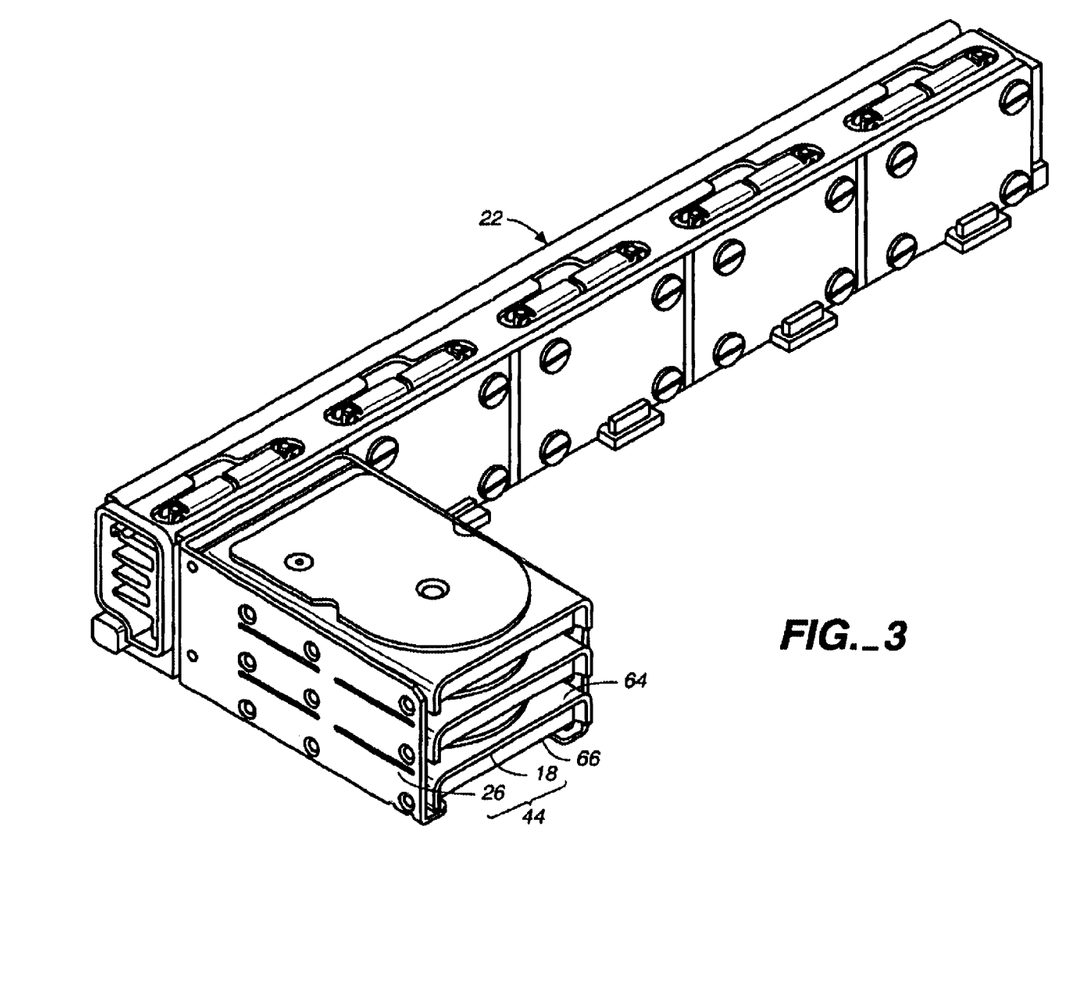
FIG. 3 is a perspective view of a drive rail, bracket and disk drives having features of the present invention.

FIG. 3 illustrates a perspective view of one of the drive rails 22 and one drive pack 44 secured to the drive rail 22. In FIG. 3, each drive pack 44 includes one bracket 26 and three storage devices 18. The actual number of storage devices 18 within each bracket 26 can be altered to suit the requirements of the particular storage system 10. The size of the brackets 26 can also be altered to receive more or fewer storage devices 18 depending on the requirements of the particular storage system 10. Within each bracket 26, the storage devices 18 are stacked vertically on top of each other. Each storage device 18 includes a top surface 64 and an opposed bottom surface 66. The storage devices 18 are secured within the bracket 26 so that the top surface 64 of one storage device 18 is directly beneath the bottom surface 66 of another storage device 18. The storage devices 18 can be placed in this position so that the distance between the surfaces 64, 66 is greater than approximately 0.05 inches. Alternately, the storage devices 18 can be positioned so that the distance between the surfaces 64, 66 is less than approximately 0.375 inches, or less than approximately 0.25 inches, or less than approximately 0.125 inches. This limited separation enables a relatively large number of storage devices 18 and a greater amount of data to be stored in a much smaller physical environment.

Figure 4:
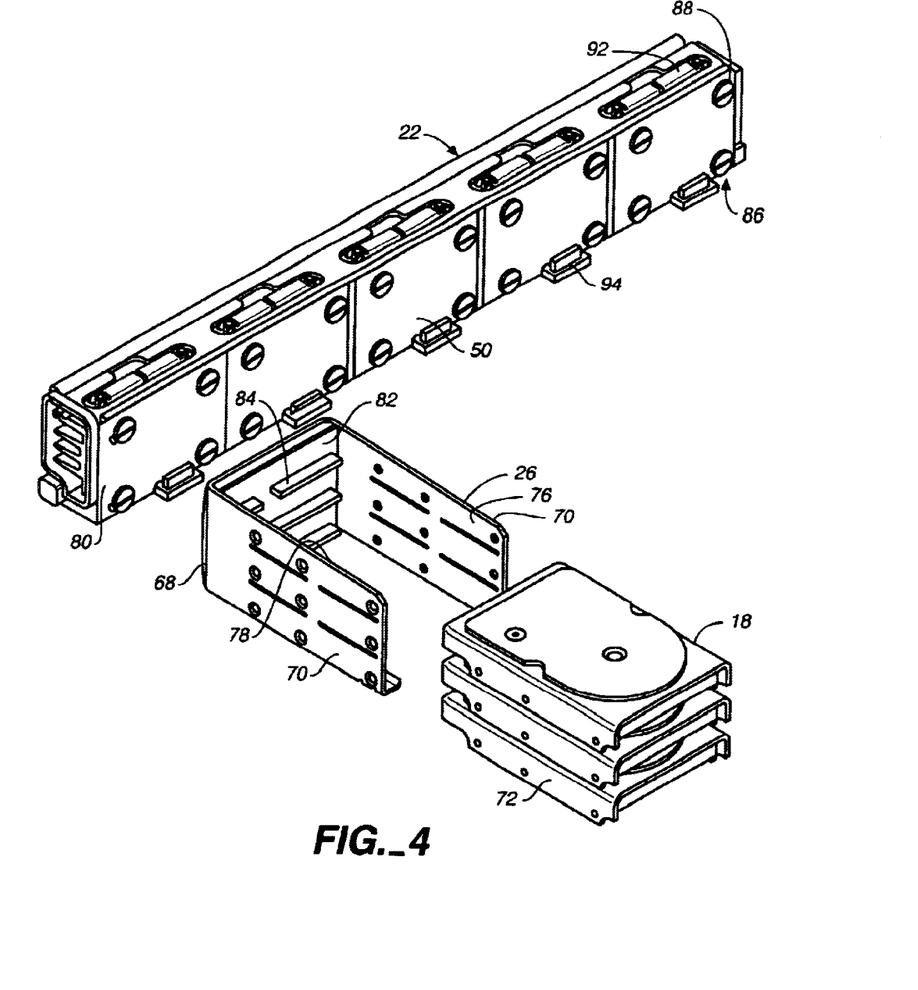
FIG. 4 is an exploded perspective view of the drive rail, bracket and disk drives of FIG. 3.

FIG. 4 illustrates a perspective view of the drive rail 22, one bracket 26 and three storage devices 18. In FIG. 4, the bracket 26 is substantially U-shaped, and receives three storage devices 18 securely within the U-shaped bracket 26. Each bracket 26 has a proximal end 68 and two extension arms 70 that extend substantially perpendicularly away from the proximal end 68. The proximal end 68 of each bracket 26 is positioned to face the attachment side 50 of the drive rail 22. The proximal end 68 of each bracket 26 then is secured to the attachment side 50 of the drive rail 22.

In FIG. 4, each side of each storage device 18 includes three apertures 72, and each of the extension arms 70 of each bracket 26 includes three apertures 74 for each storage device 18. With this design a plurality of fasteners (not shown) can be used to secure the storage devices 18 to the brackets 26.

A first thermal gasket 76 and a second thermal gasket (not shown) can be used at a mounting interface of the storage devices 18 and the bracket 26 to enhance the transfer of heat from the storage devices 18 to the bracket 26. As illustrated in FIG. 4, the first thermal gasket 76 and the second thermal gasket 78 can be located adjacent to the interior wall of the extension arms 70 of the bracket.

Additionally, a rail thermal gasket 80 can be used at the mounting interface of the brackets 26 and the drive rail 22 to further enhance conduction cooling of the storage devices 18. Each thermal gasket 76, 78, 80 can be made from a material having a relatively high thermal conductivity such as at least approximately 1.3 W/M-K. Suitable materials for the thermal gaskets 76, 78, 80 include aluminum foil coated on both sides with thermally conductive rubber.

A circuit board 82 having plurality of electrical connectors 84 can be situated adjacent to an interior wall of the proximal end 60 of the bracket 26. The electrical connectors 84 provide an electrical connection between the storage devices 18 and the bracket 26. The electrical connectors 84 are adapted to connect to corresponding storage device connectors (not shown) situated along a rear of the storage devices 18.

The drive rail 22 can be fabricated from a material with a high thermal conductivity. For example, the drive rail 22 can be fabricated from an aluminum alloy with a coefficient of thermal conductivity of at least approximately 5.8 W/IN-C°. Alternately, for example, other materials with a thermal conductivity of at least approximately 3 W/IN-C°, or 5 W/IN-C°, or 7 W/IN-C°, or 9 W/IN-C° can be used to fabricate the drive rail 22. With this design, the drive rail 22 enables much of the heat generated from the operation of the storage devices 18 to be efficiently transferred via conduction away from the storage devices 18 to the rail channel 24. With much of the heat now effectively transferred into the region of the rail channel 24, it becomes much easier to remove the heat from the storage system 10.

In FIG. 4, the drive rail 22 includes a plurality of fasteners 86 that extend through the attachment side 50. Referring to FIG. 4, the drive rail 22 can be designed to have four fasteners 86 for each bracket 26 that is secured to the drive rail 22. The fasteners 86 are designed so that there are two fasteners 86 positioned substantially vertically to secure the bracket 26 along the proximal end 68 near each extension arm 70 of the bracket 26. The upper fastener 86 on each side is positioned near the top portion of the drive rail 22 while the lower fastener 86 on each side is positioned near the bottom portion of the drive rail 22. Alternately, the actual number of fasteners 86 and the location of the fasteners 86 for each bracket 26 can be varied to suit the particular needs of the individual storage system 10.

In FIG. 4, each fastener 86 includes a head portion 88 and a shaft portion (not shown). Each fastener 86 is moved between a latched position and an unlatched position. When in the unlatched position, the head portion 88 of the fastener 86 extends away from the attachment side 50 of the drive rail 22 and is spaced apart from the attachment side 50. In the latched position, the head portion 88 of the fastener 86 is pulled back toward the attachment side 50 of the drive rail 22. When in the latched position the bracket 26 is effectively secured to the attachment side 50 of the drive rail 22.

Along the top portion of the drive rail 22 there are a plurality of latch handles 92. In the embodiment illustrated in the Figures, the drive rail 22 includes two latch handles 92 to operate the four fasteners 86 to secure each bracket 26 to the drive rail 22. The latch handles 92 are adapted to move the fasteners 86 from the latched position to the unlatched position. One latch handle 92 is typically adapted to move one pair of vertically stacked fasteners 86 from the latched position to the unlatched position.

The latch handles 92, as shown in FIG. 4, are in a closed position, parallel to the top portion of the drive rail 22. When the latch handle 92 is in the closed position, the fasteners 86 controlled by that latch handle 92 are in the latched position. The latch handles 92 can be moved to an open position (not shown) by rotating them upward substantially perpendicularly away from the top portion of the drive rail 22. When the latch handle 92 is in the open position, the fasteners 86 controlled by that latch handle 92 are in the unlatched position.

A plurality of drive rail connectors 94 can be positioned along a lower edge of the attachment side 50 of the drive rail 22. Each drive rail connector 94 has a horizontal portion and a vertical portion. The horizontal portion of each drive rail connector 94 is secured to the attachment side 50 of the drive rail 22 and extends substantially perpendicularly away from the attachment side 50. The vertical portion of each drive rail connector 94 extends up vertically near an end of the horizontal portion farthest away from the attachment side 50 of the drive rail 22. Each drive rail connector 94 is adapted to electrically connect the circuit board 82 on one of the brackets 26 to the drive rail 22. Each drive rail connector 94 is adapted to connect to a corresponding electrical connector (not shown) situated along the bottom edge of the circuit board 82.

Figure 5:
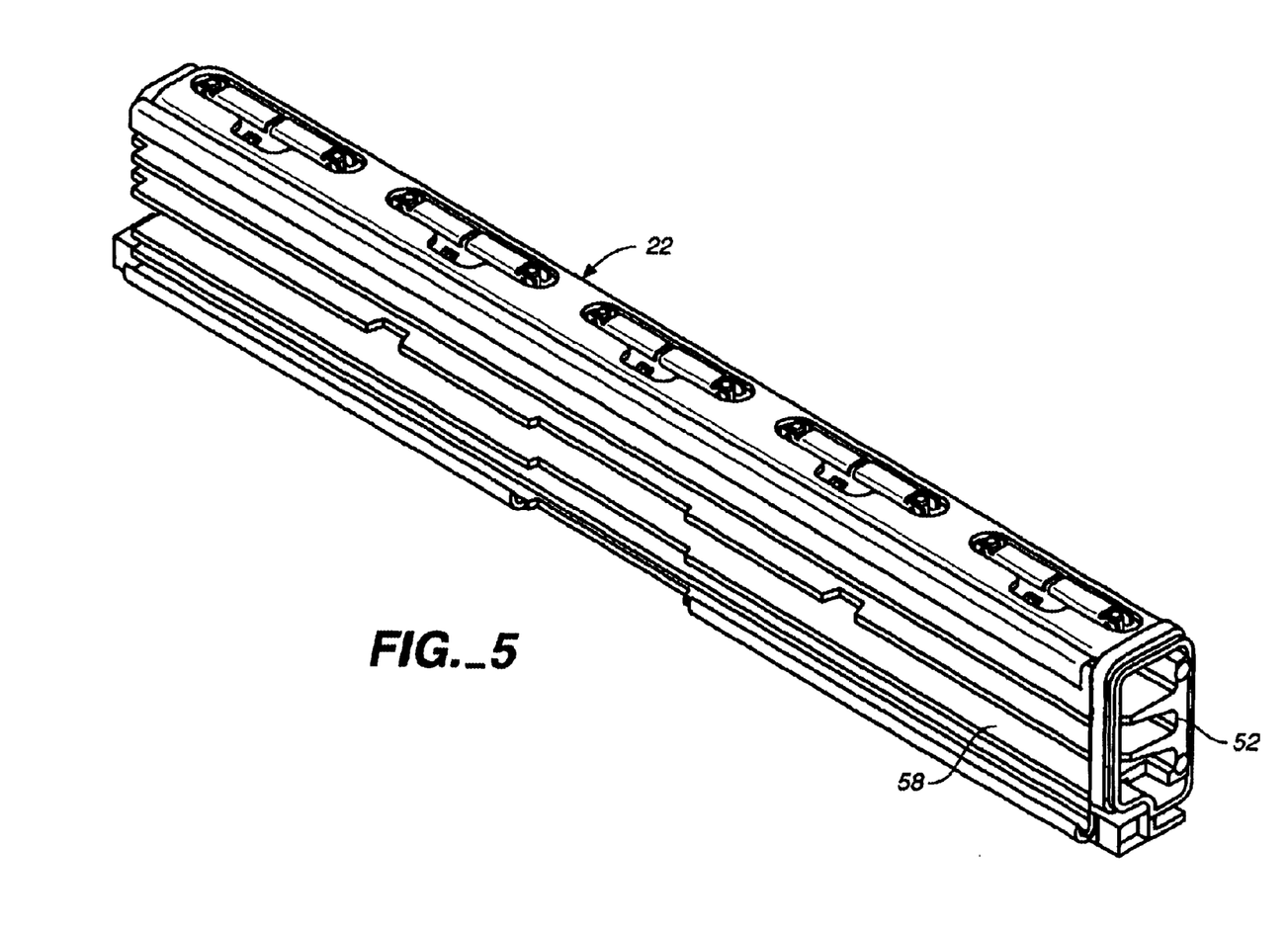
FIG. 5 is a perspective view of a drive rail having features of the present invention.

FIG. 5 illustrates a perspective view of one of the drive rails 22. FIG. 5 illustrates that the fins 58 cantilever away from the channel side 52 of the drive rail 22 and extend substantially the entire length of the drive rail 22. The fins 58 can be made as an integral part of the drive rail 22 and can be fabricated from the same materials as the drive rail 22. As mentioned previously, the fins 58 extend into the rail channel so that the surface area of the channel side 52 of the drive rail 22 is increased. This enhances heat transfer from the drive rail 22 to the fluid in the rail channels.

Figure 6A:
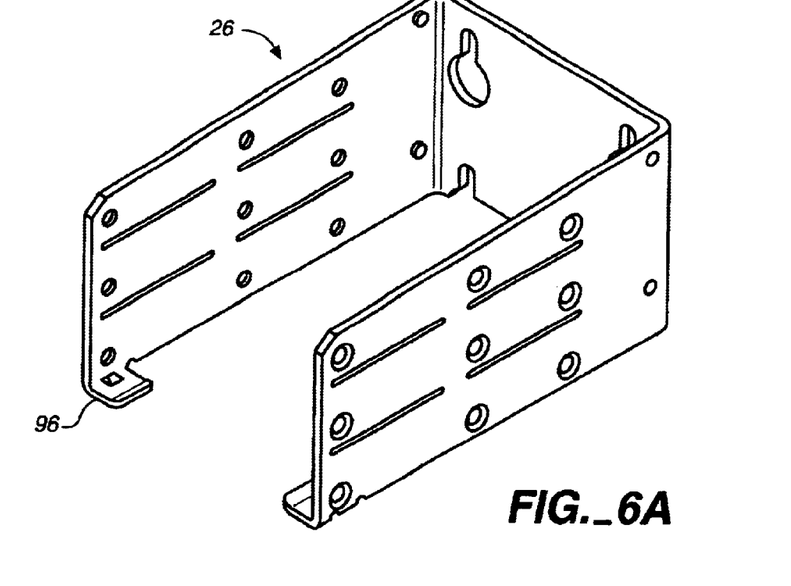
FIG. 6A is a perspective view of a bracket having features of the present invention.

FIG. 6A illustrates a front perspective view of the bracket 26. Each bracket 26 can be fabricated from a with a coefficient of thermal conductivity of at least approximately 9.89 W/IN-C°. Alternatively, for example, other materials with a thermal conductivity of at least approximately 3 W/IN-C°, or 5 W/IN-C°, or 7 W/IN-C°, or 9 W/IN-C° may be used to fabricate the brackets 26. By designing the brackets 26 of a material with high thermal conductivity, the brackets will enable much of the heat generated from the operation of the storage devices 18 to be transferred via conduction away from the storage devices 18 and toward the drive rail 22 and into the rail channel 24.

As shown in FIG. 6A, the bracket 26 can include a pair of storage device supports 96 to help support the bracket 26 with the housing.

Figure 6B:
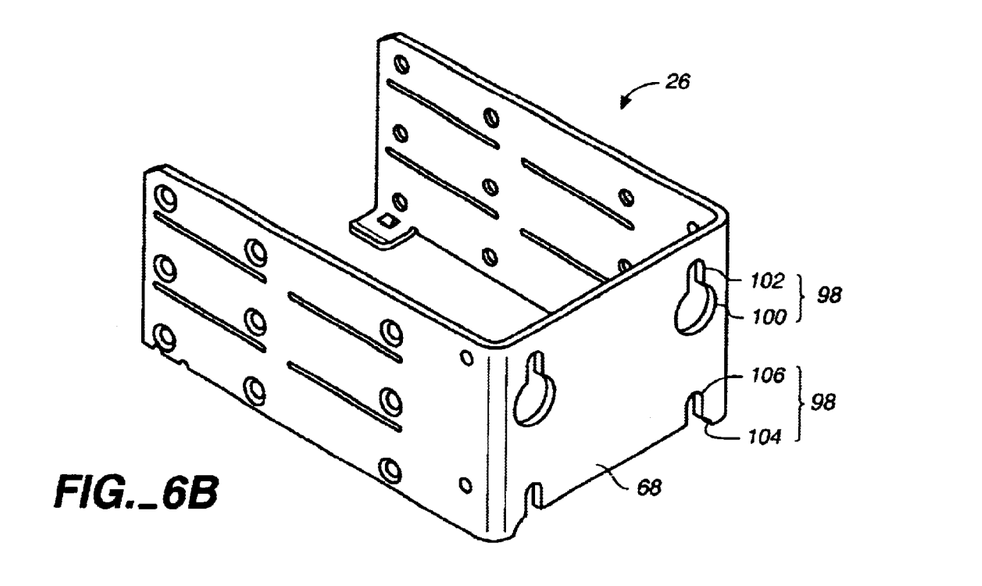
FIG. 6B is a perspective view of the bracket of FIG. 6A rotated approximately 90 degrees.

FIG. 6B illustrates an alternate perspective view of the bracket 26. In this embodiment, the proximal end 68 of the bracket 26 includes four attachment holes 98 that are adapted to receive the fasteners 86 (illustrated in FIG. 4) of the drive rail 22 (illustrated in FIG. 4). To correspond with the fasteners 86, each bracket 26 includes two upper attachment holes 98 and two lower attachment holes 98. The upper attachment holes 98 have a circular portion 100 and a slot portion 102. Situated along a top portion of each upper attachment hole 98 is the slot portion 102 that extends upward from the circular portion 100 of the upper attachment hole 98. The lower attachment holes 98 have a semicircular portion 104 that extends upward from the bottom of the bracket 26 and a slot portion 106. Situated along a top portion of each lower attachment hole is the slot portion 106 that extends upward from the semicircular portion 104 of the attachment hole 98.

The fasteners 86 are adapted so that the head portion 88 and the shaft portion of each fastener 86 fits fully though the circular or semicircular portion 100, 104 of the attachment holes 98 of the bracket 26. Only the shaft portion of each fastener 86, and not the head portion 88, is adapted to fit through the slot portion 102, 106 of the attachment hole 98. In the unlatched position, the head portion 88 and the shaft portion of the fastener 86 can fit through the circular or semicircular portions of the attachment holes 98. The bracket 26 can then be moved downward so that the shaft portion of the fastener 86 fits into the slot portion of the attachment hole 98. With the shaft portion of the fastener 86 in the slot portion of the attachment hole 98, the fasteners 86 are then moved to the latched position to securely fasten the bracket 26 to attachment side 50 of the drive rail 22.

In order to remove the bracket 22 from the fasteners 86, the fasteners 86 must be moved to the unlatched position. In the unlatched position, the bracket 26 may be lifted so that the head portion of the fastener 86 can once again easily fit through the circular or semicircular portion of the attachment hole 98. With the bracket 26 removed from the fastener 86, the bracket 26 is no longer secured to the drive rail 22.

Alternately, for example, the upper attachment holes can be substantially semicircular and the lower attachment holes can be substantially circular. In this case, the slot portion of each attachment hole will be situated along a bottom portion of each attachment hole. Then, the bracket 26 can be moved downward to remove it from the fastener and lifted upward so that it can be secured to the drive rail 22 when the fastener is in the latched position.

What is claimed is:

1. A storage system comprising:
   a plurality of storage devices;
   a drive rail having a channel side and an attachment side, the drive rail having a plurality of fins that cantilever away from the channel side of the drive rail substantially perpendicularly; and
   a bracket adapted to receive the plurality of storage devices and to secure the plurality of storage devices to the attachment side of the drive rail, the bracket being adapted to transfer heat away from the plurality of storage devices to the drive rail.

2. The storage system of claim 1 wherein the drive rail is made from material with a thermal conductivity of at least approximately 3 W/IN-C°.

3. The storage system of claim 1 wherein the fins extend substantially the entire length of the drive rail.

4. The storage system of claim 1 wherein the bracket is made from a material with a thermal conductivity of at least approximately 3 W/IN-C°.

5. The storage system of claim 1 wherein the bracket is substantially U-shaped.

6. The storage system of claim 1 wherein the plurality of storage devices are situated so that a top surface of one storage device is directly beneath a bottom surface of another storage device, wherein the distance between the surfaces is less than approximately 0.375 inches.

7. The storage system of claim 1 further comprising a plurality of brackets, the plurality of brackets adapted to secure the plurality of storage devices to the attachment side of the drive rail, the plurality of brackets being adapted to transfer heat away from the plurality of storage devices to the drive rail.

8. The storage system of claim 1 further comprising a rail channel positioned adjacent to and at least partly bounded by the channel side of the drive rail.

9. The storage system of claim 7 wherein the plurality of brackets are positioned side-by-side along to the drive rail, wherein the distance between each of the brackets is less than approximately 0.375 inches.

10. The storage system of claim 8 further comprising a housing that substantially surrounds the drive rail, wherein the rail channel is at least partly bounded by the housing.

11. The storage system of claim 8 further comprising a fluid source that provides a fluid, wherein at least a portion of the fluid from the fluid source is moved through the rail channel to remove heat that is transferred away from the at least one storage device to the drive rail.

12. The storage system of claim 11 wherein at least approximately 15% of the fluid from the fluid source is moved through the rail channel.

13. The storage system of claim 11 wherein at least approximately 35% of the fluid from the fluid source is moved through the rail channel.

14. The storage system of claim 11 wherein at least approximately 15% of the heat generated by operation of the at least one storage device is transferred to the drive rail and removed through the rail channel.

15. The storage system of claim 11 wherein at least approximately 35% of the heat generated by operation of the at least one storage device is transferred to the drive rail and removed through the rail channel.

16. A storage system comprising:
    a housing;
    a first drive rail positioned within the housing, wherein the first drive rail has an attachment side and a channel side, the first drive rail having a fin that cantilevers away from the channel side substantially perpendicularly to the channel side, the first drive rail being made from material with a thermal conductivity of at least approximately 3 W/IN-C°;
    a first rail channel bounded by the housing and the channel side of the first drive rail;
    a plurality of brackets secured to the attachment side of the first drive rail, the plurality of brackets being made from material with a thermal conductivity of at least approximately 3 W/IN-C°;
    a plurality of storage devices adapted to fit within the plurality of brackets, wherein three storage devices are adapted to fit within each of the plurality of brackets; and
    a fluid source that provides a fluid, wherein at least a portion of the fluid from the fluid source is moved through the first rail channel to remove heat that is transferred from the plurality of storage devices to the first drive rail.

17. The storage system of claim 16 including five brackets and fifteen storage devices.

18. The storage system of claim 16 further comprising a second drive rail positioned within the housing, wherein the second drive rail has an attachment side and a channel side, the second drive rail having a fin that cantilevers away from the channel side substantially perpendicularly to the channel side, the second drive rail being made from material with a thermal conductivity of at least approximately 3 W/IN-C°.

19. The storage system of claim 18 further comprising a second rail channel bounded by the housing and the channel side of the second drive rail.

20. The storage system of claim 19 further comprising ten brackets, wherein five brackets are secured to the attachment side of the first drive rail and five brackets are secured to the attachment side of the second drive rail.

21. The storage system of claim 19 wherein at least approximately 70% of the fluid from the fluid source is moved through the first rail channel and the second rail channel.

22. The storage system of claim 19 wherein at least approximately 30% of the heat generated by the operation of the plurality of storage devices is transferred to the first drive rail and the second drive rail and removed through the first rail channel and the second rail channel.

23. The storage system of claim 20 further comprising thirty storage devices, wherein three storage devices are secured to each of the ten brackets.

24. A method for cooling a storage system having a storage device that generates heat while in operation, the method comprising:

providing a drive rail having a channel side and an attachment side;

coupling the storage device to the attachment side of the drive rail;

providing a rail channel positioned adjacent to and at least partly bounded by the channel side of the drive rail; and directing a fluid through the rail channel to remove heat that is transferred from the storage device to the drive rail.

25. The method of claim 24 including the step of transferring at least approximately 35% of the heat generated by the operation of the storage device to the drive rail.

26. The method of claim 24 wherein the step of providing a drive rail includes providing a drive rail made from material with a thermal conductivity of at least approximately 3 W/IN-C°.

27. The method of claim 24 wherein the step of providing a drive rail includes providing a drive rail having a plurality of fins that cantilever away from the channel side of the drive rail substantially perpendicularly.

28. The method of claim 24 further comprising the step of coupling a bracket to the attachment side of the drive rail, wherein the bracket is adapted to receive the storage device and to couple the storage device to the attachment side of the drive rail.

29. The method of claim 24 further comprising the step of providing a housing adapted to substantially surround the drive rail, wherein the rail channel is at least partly bounded by the housing.

30. The method of claim 28 wherein the bracket is made from material with a thermal conductivity of at least approximately 3 W/IN-C°.

* * * * *